Nov. 11, 1969  R. P. FRITSCH  3,477,101
APPARATUS FOR SHAPING RAW RUBBER BODIES
Filed Feb. 21, 1966  4 Sheets-Sheet 1
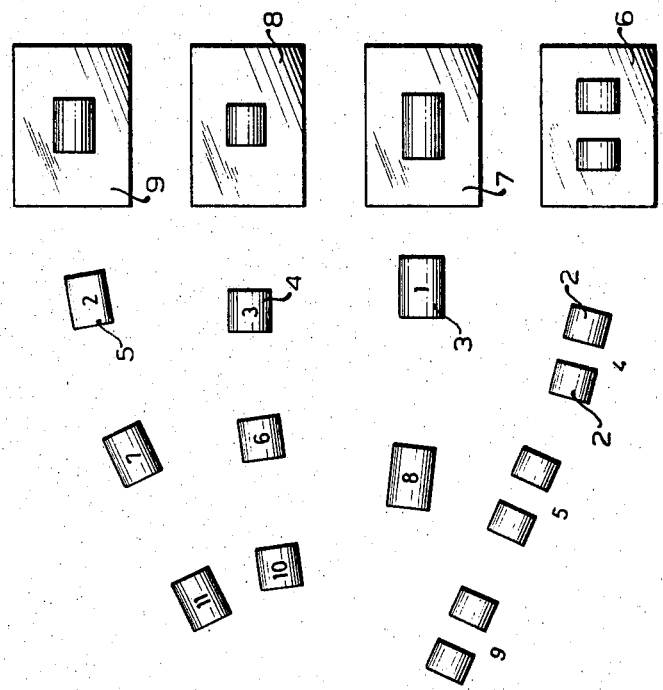
FIG.1
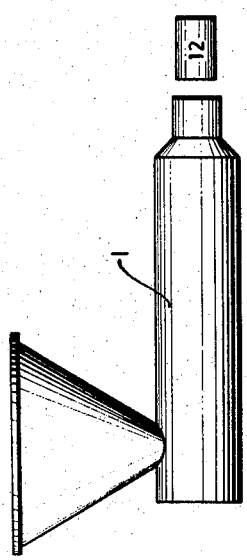
INVENTOR
Rudolf Paul Fritsch
BY Hane and Nydick
ATTORNEYS INVENTOR
Rudolf Paul Fritsch
BY Hane and Nydick
ATTORNEYS Nov. 11, 1969  R. P. FRITSCH  3,477,101
APPARATUS FOR SHAPING RAW RUBBER BODIES
Filed Feb. 21, 1966  4 Sheets-Sheet 4

INVENTOR
RUDOLF PAUL FRITSCH

BY Hane and Nydick
ATTORNEYS

United States Patent Office 3,477,101
Patented Nov. 11, 1969

3,477,101
APPARATUS FOR SHAPING RAW RUBBER BODIES
Rudolf Paul Fritsch, Stuttgart-Weilimdorf, Germany, assignor to Werner & Pfleiderer, Stuttgart-Feuerbach, Germany, a German company
Filed Feb. 21, 1966, Ser. No. 528,962
Claims priority, application Germany, Mar. 10, 1965,
W 38,723
Int. Cl. B29h 3/00
U.S. Cl. 18—30   8 Claims

ABSTRACT OF THE DISCLOSURE

A device for shaping form-stable generally cylindrical raw rubber bodies from thermoplastic raw rubber starting material comprises a screw conveyor for conveying the starting material while simultaneously heating the same by internal friction and/or external heat to a softening temperature, into a generally cylindrical shaping cavity one wall of which is resiliently displaceable to force the material by the counter pressure of said wall into a shape substantially filling the available space in the cavity. The thus obtained shaped rubber body is removed from the cavity while still being soft for further processing in a vulcanizing press.

---

The present invention relates to an apparatus for producing shaped bodies of raw rubber or a mixture containing raw rubber.

It is standard practice to feed into the injection assemblies of vulcanizing presses pieces of raw rubber or of a mixture containing raw rubber. The pieces are obtained by cutting a prepared strand of such material into pieces of predetermined length. The pieces of raw rubber, sometimes referred to as slugs, are supplied to the vulcanizing press in cold condition. They must then be heated in the press to the extent necessary for softening the raw rubber to a point at which it can be injected. The softened material is finally injected into the mold cavity of the press in which it is shaped under pressure and vulcanized.

Among the disadvantages of the afore-indicated conventional method is that the dividing off of pieces of raw rubber to form the slugs is rather inaccurate so that it is generally necessary to weigh the slugs as it is essential to maintain the slugs within rather narrow tolerances. Furthermore, the heating of the slugs in the press for the purpose of softening the same is time consuming. Moreover, the heating of the slugs is in the nature of a preparatory step and this represents a loss of time for operation of the vulcanizing press for the purpose for which it is primarily intended.

The use of inaccurately measured slugs results in final rubber shapes having cavities, or manifests itself in a substantial creeping of the material into the gap between the two parts of a two part mold, whereby the two mold parts are forced apart from each other. As a result, the obtained rubber shapes are not within acceptable dimensional tolerances and must be subsequently finished which is also time consuming and expensive.

It is one of the objects of the invention to provide a novel and improved apparatus for producing rubber shapes in a vulcanizing press with an injection assembly in a more effective and economical manner than was heretofore possible.

A more specific object of the invention is to provide a novel and improved apparatus for producing rubber shapes in vulcanizing presses with injection assembly which method substantially reduces the time required to heat the raw rubber slugs for purpose of softening the same or even completely eliminates such heating time, thereby permitting a more economic use of the vulcanizing presses for the function proper of the same.

Another more specific object of the invention is to provide a novel and improved apparatus for producing rubber shapes which results in products which, when being removed from the vulcanizing press, are in generally fully acceptable condition, thus greatly reducing, if not completely eliminating, any subsequent finishing work.

The aforepointed out objects, features and advantages of the invention are attained by providing separate softening and shaping means into which the raw rubber to be softened is fed. The raw rubber fed into the softening and shaping means is heated therein to an extent such that the raw rubber obtains the desired softness and it is also shaped in the softening and shaping means to a predetermined volume and shape. The slugs thus formed are then fed to a vulcanizing press. As it is evident, the method of the invention carries out the preliminary step heretofore carried out in the vulcanizing press itself in a separate device so that the press itself remains always available to carry out its primary function.

It is also an object of the invention to provide a novel and improved apparatus for producing slugs of raw rubber of predetermined but different weights and shapes. The different slugs may then be fed to a selected one of several vulcanizing presses, each of which includes a mold cavity dimensioned for receiving a specific one of the prepared different slugs.

Another more specific object of the invention is to provide a novel and improved apparatus for preparing raw rubber slugs for final shaping and vulcanizing in a vulcanizing press, which method assures that slugs completely fill the shaping cavity in which they are formed so that each slug has the same weight for a given shape or volume, thereby eliminating the need for weighing the slugs before the same are fed into a vulcanizing press.

The invention separate from the vulcanizing press proper may comprise an extruder, such as a rotary worm type extruder, and a shaping means including a shaping cavity into which the raw rubber is forced by the extruder. The extruder may be heatable, and may comprise different heating zones. However, in some instances, an external heating of the worm extruder is not necessary. The heat generated by the internal friction in the raw rubber while being conveyed through the extruder may be enough to heat the raw rubber to a temperature at which it is sufficiently soft. The shaping means, or more specifically, the shaping cavity thereof, may be adjustable as to its capacity and shape and it may be arranged to be opened to remove the finished slug from the shaping cavity. If desired, the shaping means may also be equipped with suitable heating means. As it is evident, external heating of the extruder and also of the shaping means of the device according to the invention, results in a substantially uniform heating of the raw rubber and thus in a substantially uniform softening thereof.

If desired, vent ports may be included in the wall of the drum housing the extruder worm for the purpose of degasifying the raw material. The vent ports may be connected to a suitable suction means for efficiently removing components in gaseous condition which may be liberated so that the slugs, when finished, have a substantially homogeneous composition.

The shaping means may be in the form of an open-ended cylinder one end of which is in communication with the discharge end of the extruder and the other end of which accommodates a piston. As it is evident, the shape and weight of the slug are controlled by the position of the piston in the cylinder. Moreover, the diameter of the slug is uniform along its entire length which makes it very convenient to control the weight of the slug by its length. The peripheral outline of the slug may be so selected that it conveniently fits the usually cup-shaped receiving aperture of the injection assembly of a vulcanizing press. The piston of the cylinder of the shaping means may be moved by a suitable pressure means, such as a hydraulically operated servo means, into a position in which it is closely adjacent to the discharge end of the extruder. As a result, the volume of the shaping cavity is initially very small and increases in volume only as the raw rubber is forced into the cylinder and presses the piston back whereby occlusions of air in the material in the shaping cavity are effectively avoided.

The position of the piston may be utilized to control the drive for the extruder worm by providing a movable switch contact moving in unison with the piston and controlling one or several stationary switch contacts spaced apart in the direction of displacement of the piston. The movable and the stationary contacts may be connected in conventional control circuits so that the worm is shut off when the movable switch contact engages a selected one of the stationary contacts. The switching means can be conveniently so arranged that the drive of the worm is shut off when the piston reaches a position representing a slug of a selected length. A cycling means may control the circuit connections so that a predetermined sequence of slugs of different lengths are produced.

The opening and closing of the shaping means for the purpose of removing a finished slug and readying the shaping means for shaping another slug may be operated by suitable pressure means which, in turn, may be controlled by suitable and conventional control means.

In the accompanying drawing, a preferred embodiment of the invention is shown by way of illustration and not by way of limitation.

In the drawing:

FIG. 1 shows diagrammatically a process flow sheet representing the method of the invention;

Figure 2:
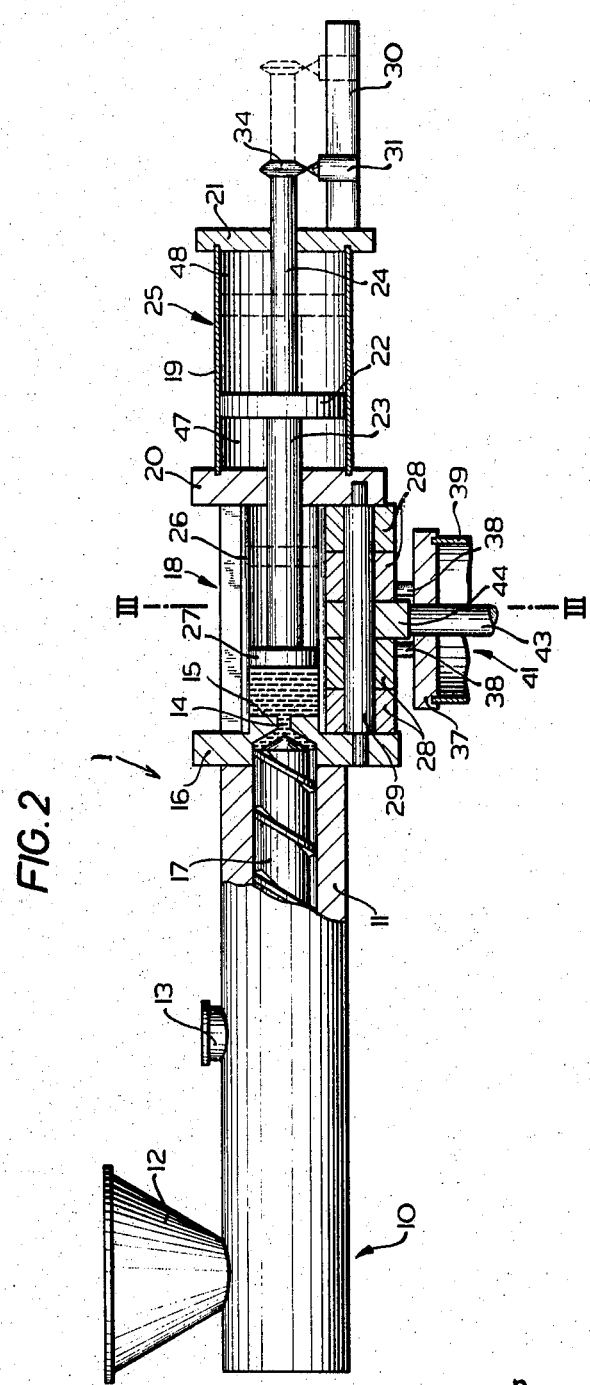
FIG. 2 is a diagrammatic longitudinal section of a pre-softening and pre-shaping device according to the invention.

Referring first to FIG. 1 in detail, the flow sheet shows diagrammatically a pre-softening and pre-shaping device 1, and a plurality of softened and shaped raw rubber slugs. These slugs should be visualized as having been produced in device 1 in a manner which will be more fully described hereinafter. Numerals have been arbitrarily applied to some of the slugs, but further elucidation of these numerals is not essential for the understanding of the invention. As it is apparent, the slugs all have a cylindrical peripheral outline but different axial lengths. Obviously, slugs of different lengths contain different quantities of raw rubber. The slugs are fed by suitable and conventional means to vulcanizing presses diagrammatically indicated at 6, 7, 8 and 9. The structures and functions of the vulcanizing presses should be understood to be conventional and do not constitute part of the present invention. It should only be noted that the mold cavities indicated in the presses are of different lengths and are thus designed to fit different slugs. For instance, the cavities of press 6 are designed to receive slugs numbered 2, etc.

It should be noted that the concept of the invention is not limited to the shaping of generally cylindrical slugs, or to a particular length of such slugs.

Referring now to FIGS. 2 through 7, the pre-softening and pre-shaping device as shown comprises an extruder assembly 10, including a rotary screw conveyor 17 of conventional design rotatably mounted in a drum 11. The power drive for the worm or screw is not shown in detail and should be visualized as being conventional. The extruder may be equipped with suitable and conventional heating means which may act upon different lengthwise zones of the extruder in a different manner. Zonal heating means of this kind are well understood in the art. The raw rubber containing mixture to be pre-softened and pre-shaped in preparation for conventional final shaping and vulcanizing is fed to one end of the extruder drum by suitable feeding means diagrammatically shown as a hopper 12. One or several venting ports 13 may be provided in the drum for de-gassing the raw material as it is conveyed within the extruder. The ports may be connected, if desirable, to a suction line in a conventional manner. The other end of the extruder drum is closed off by a head plate 16 which is outwardly extended by a cylindrical boss 15, including an extruder nozzle 14. The outer diameter of boss 15 controls the diameter of the slug to be formed as will become more fully apparent from the subsequent description. Extruder assembly 10 coacts with a shaping assembly 18. This assembly comprises a cylindrical mold having two complementary parts 26 in which a piston 27 is slidable. As it is clearly shown in FIG. 2, the mold is closed off at one end by the head plate 16 and its boss 15 and at the other end by a cover plate 20 which also constitutes an end wall for a cylinder 19 which is closed off at its other end by a cover plate 21. A plunger 22 is slidable in cylinder 19. The plunger 22 is coupled on one side by a rod 23 to piston 27 and mounts, on its other side, a rod 24 slidably extended through end plate 21 and mounting at its outer end a contact 34, the purpose of which will be more fully explained hereinafter. Cylinder 19, its end walls 20 and 21, plunger 22 and rods 23 and 24 constitute a servo-unit 25.

All the heretofore described structural components of the device should be visualized as being made of suitable material capable of withstanding the stresses and forces involved. The material used for making the components of shaping assembly 18 should be made of particularly strong material and the surfaces of mold parts 26 defining the shaping cavity should be hardened and polished.

Figure 3:
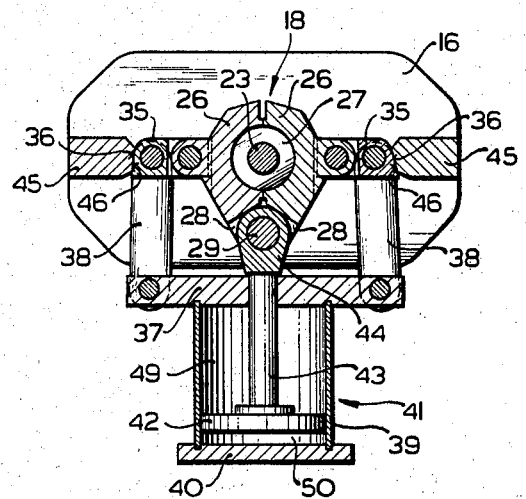
FIG. 3 is a section taken on line III—III of FIG. 2 showing the device on an enlarged scale, the shaping assembly of the device being illustrated in its closed position.
Figure 4:
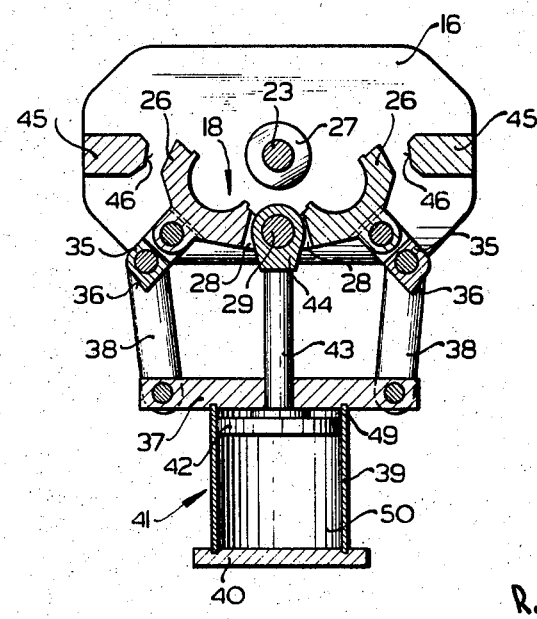
FIG. 4 is a section similar to FIG. 3, but showing the shaping device in its open position.

Turning now to FIGS. 3 and 4, these figures show the shaping assembly 18 in gretaer detail. As it is clearly apparent from the figures, the complementary parts 26 are movable between the position shown in FIG. 3 in which the shaping cavity is closed and the position of FIG. 4 in which the shaping cavity is open to remove a finished slug therefrom. To move mold parts 26 from the position of FIG. 3 into the position of FIG. 4, or vice versa, each mold part has a bearing eye 28. A pivot shaft 29 extends through these eyes and is mounted in head plate 16 and end plate 20, as it is clearly shown in FIG. 2. Furthermore, each mold part 26 has an eye flange 35 formed with a wedge or cam surface 36. Links 38 are linked at one end to eye flanges 35 and at the other end to a cover plate 36, which constitutes an end plate for a cylinder 39 closed at its other end by a cover plate 40. A plunger 42 is slidable in cylinder 39 and coupled by a rod 43 to an eye flange 44 which, in turn, is seated on pivot shaft 29. The just described structural components constitute a second servo-unit 41.

Head plate 16 and end plate 20 are joined by cross bars 45 which have wedge or cam surfaces 46 on the side facing mold parts 26.

As it is apparent from the previous description, servo-unit 25 provides, on one side of plunger 22, a closed cylinder space 47 and on the other side, a closed cylinder space 48. Similarly, servo-unit 41 provides, on one side of plunger 42, a closed cylinder space 49 and on the other side, a closed cylinder space 50.

The aforedescribed contact 34, which is movable in unison with rod 24 and thus with piston 27, coacts with a stationary contact 31. Engagement of contacts 31 and 34 should be visualized as activating a suitable control circuit for disconnecting the drive for worm 17 for a purpose which will be more fully described hereinafter, or also for other suitable supervisory functions. Control circuits of this kind are well understood in the art and do not constitute part of the invention as such. Contact 31, while operationally stationary, may be adjustable on a bar 30 as it is indicated in FIG. 2 in dotted lines.

Figure 7:
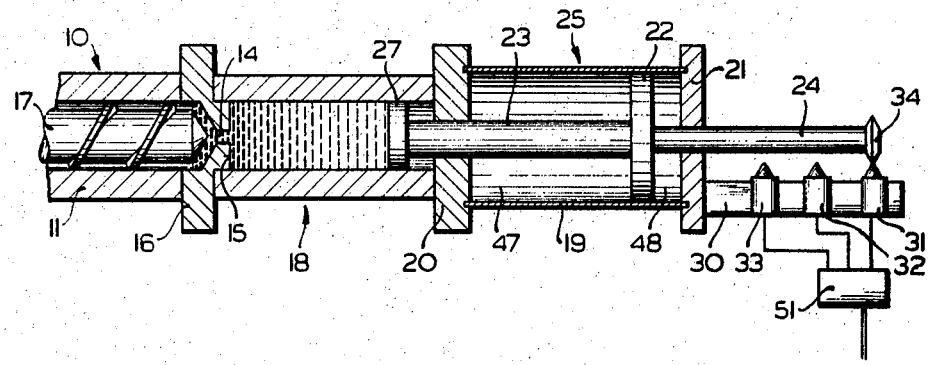
FIG. 7 is a sectional view similar to FIGS. 5 and 6, but showing the device in its position upon completion of a slug forming operation.

In the event several control positions for moving contact 34 are desired, several operationally stationary contacts may be provided. Two additional contacts 32 and 33 are shown in FIG. 7. Contacts 31, 32 and 33 may be connected to a suitable and conventional cycling device 51 which energizes the several contacts in a desired sequence, thereby causing disconnection of worm 17 at different positions of piston 27 for a purpose which will also be more fully explained hereinafter.

The function of the device as hereinbefore described, is as follows:

The raw rubber containing mixture is fed in pulverized, granulated or other convenient form to the extruder assembly by means of hopper 12. While the material is travelling through the extruder, it is softened by the increase of its temperature while being in the extruder. As stated before, the internal friction experienced by the material while being conveyed may be sufficient to generate the required temperature, but if desired or necessary, external heat may be applied as also previously described. The temperature of the raw rubber when reaching the discharge end of the extruder is so selected that the resulting softening of the material is suitable for a direct injection of the material into a vulcanizing press as referred to in connection with FIG. 1. Any gases liberated from the material are discharged through vent ports 13.

Figure 5:
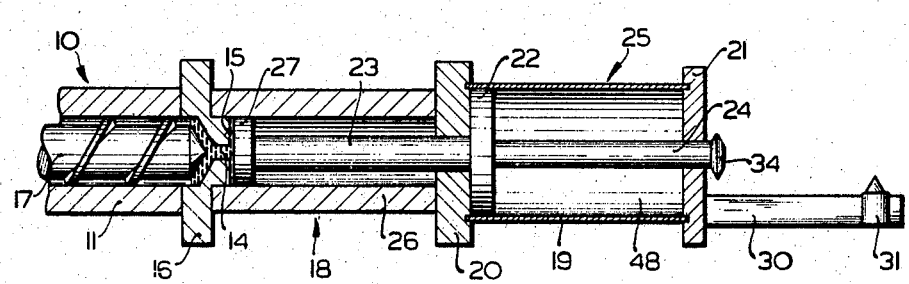
FIG. 5 is a diagrammatic longitudinal section of the device showing the same in the position for starting a softening and shaping operation.
Figure 6:
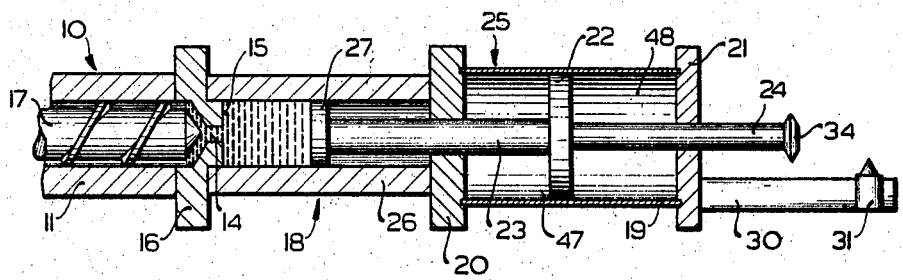
FIG. 6 is a sectional view similar to FIG. 5, but showing the device in an intermediate operational position.

At the beginning of each shaping operation, piston 27 of the shaping assembly 18 is in the position shown in FIG. 5, that is, in a position very closely adjacent to the face wall of boss 15. Accordingly, the heated and thus softened raw rubber mixture will initially take the shape of a very thin disc when being extruded through nozzle 14 into the shaping cavity defined by mold parts 26. The extruding pressure is so selected that it will gradually force piston 27 from the position of FIG. 5 into the position of FIG. 6 and beyond this position towards the position of FIG. 7 against the counter pressure that may exist in cylinder space 48, as is evident, such counter pressure, which continuously acts upon piston 27, causes the soft raw rubber entering into the shaping cavity continuously to occupy fully the available space in this cavity as the same is gradually increased by the yielding of piston 27. Accordingly, the slug configuration is controlled by the capacity of the shaping cavity and it will be free of internal cavities. In other words, each slug will be uniformly shaped and its raw rubber content is entirely determined by its length.

The axial length of the slug is controlled by the positioning and energization of contacts 31, 32 and 33. In FIG. 7, contact 34, the position of which is obviously controlled by the position of piston 27, is shown in engagement with contact 31 and it is assumed that this contact is energized. Accordingly, the drive for worm 17 is stopped when the slug has reached the length shown in FIG. 7.

To remove the now finished slug from the shaping cavity, a pressure fluid is fed into cylinder space 47 and discharged from cylinder space 48 by any suitable control means (not shown). As previously pointed out, such pressure fluid control means are well known in the art and do not constitute part of the invention. The reversal of the pressure conditions in cylinder spaces 47 and 48 causes displacement of piston 27 and plunger 22 toward the right. Immediately after the pressure reversal in cylinders 47 and 48, or simultaneously therewith, pressure fluid is supplied to cylinder space 50 of servo-unit 41. Accordingly, plunger 42 is lifted from the position of FIG. 3 toward and into the position of FIG. 4. As a result, the engaged wedge surfaces 36 and 46 on cross bars 45 and eye flanges 35, respectively, are disengaged and the two mold parts 26 now swing outwardly about pivot shaft 29. The finished soft slug can now be removed from the shaping cavity and directly fed to a vulcanizing press. As previously explained, the slug can be directly injected into the press for final shaping and vulcanization without requiring further heating in the press. Accordingly, the capacity of the press may be utilized to the fullest extent.

Moreover, the length of the slugs can be conveniently adjusted by the setting of the operationally stationary contacts 31, 32 and 33, as previously described. Accordingly, presses having different cavities, such as is shown in FIG. 1, can be successively supplied by means of a single pre-softening and pre-shaping device.

After removal of the finished slug, pressure fluid is supplied in a suitable and conventional manner to cylinder space 49 of servo-unit 41 and the pressure fluid in cylinder space 50 is discharged. Accordingly, plunger 42 will return from the position of FIG. 4 into the position of FIG. 3, thereby causing reclosing of the mold parts 26. Due to the action of wedging or cam surfaces 36 and 46, a tight closing of the mold parts is assured.

Finally, pressure is again applied to cylinder space 48, thereby returning piston 27 from its withdrawn position of FIG. 7 into the position of FIG. 5. Such displacement of the piston disengages contact 31 and 34 and the device is now ready for a new operational cycle.

Obviously, the shaping device can be modified in several respects, for instance, several lengthwise spaced contacts may be provided on rod 24 which coact with one or several stationary contacts in selected positions of piston 27. The shaping assembly may comprise a closed mold and the piston 27 may have on its side facing the raw rubber material an undercut recess so that the finished slug can be withdrawn from the cavity together with the piston.

While the invention has been described in detail with respect to certain now preferred examples and embodiments thereof, it will be understood by those skilled in the art, after understanding the invention, that various changes and modifications may be made without departing from the spirit and scope of the invention, and it is intended, therefore, to cover all such changes and modifications in the appended claims.

I claim:

1. A device for shaping form-stable generally cylindrical raw rubber bodies from thermoplastic raw rubber starting material, said device comprising in combination:
    a screw extruder for conveying and heating starting material to a temperature softening the same;
    a shaping means including a generally cylindrical shaping cavity, said cavity communicating at one end with the discharge end of said extruder in axial alignment therewith for conveying softened material into said cavity, the other end of said cavity being constituted by a resiliently displaceable end wall, said end wall applying to softened material in the cavity a continuous counter pressure forcing the material to conform to the shape of said cavity; and
    control means controlled by the position of displacement of said end wall within the cavity and controlling said extruder to stop the same in a predetermined position of displacement of the end wall.

2. A device according to claim 1, wherein said extruder comprises a housing rotatably supporting the screw of the extruder, said housing having at least one vent port for degassing the raw rubber while being conveyed through said extruder.

3. A device according to claim 1, wherein said shaping means comprises an open ended hollow cylinder defining said shaping cavity, one end of said cylinder communicating with the discharge end of said extruder, and wherein said end wall comprises a piston slidable in said cylinder to close the other end thereof, the capacity and shape of the shaping cavity being controlled by the position of the piston in the cylinder.

4. A device according to claim 3, and pressure means coacting with said piston for urging the same in the cylinder toward said one cylinder end.

5. A device according to claim 1 wherein said control means comprise switching means controlled by the position of the piston in the cylinder and controlling the extruder to stop the rotation of the screw thereof in a selected one of several predetermined positions of the piston in the cylinder.

6. A device according to claim 5, wherein said switching means comprise a movable switch contact moving in unison with the piston and at least one operationally stationary switch contact, said stationary switch contact being energizable for causing stoppage of the extruder screw by engagement of the movable switch contact with the stationary contact.

7. A device according to claim 6, wherein said switch means comprise several operationally stationary switch contacts mounted spaced apart in lengthwise alignment with the piston movement in the cylinder, said stationary switch contacts being selectively energizable, one by one, for causing stoppage of the extruder screw upon engagement of the movable switch contact with the energized stationary contact, and cycling means for energizing said stationary switch contacts in a predetermined sequence.

8. A device according to claim 1, wherein said shaping means comprise a tubular member composed of two lengthwise extending complementary parts, the interior of said member defining said shaping cavity, hinge means on said member for pivoting the parts thereof between a cavity closing position and a cavity opening position to remove a softened and shaped raw rubber body from the tubular member in the open position of the parts thereof, and actuating means coacting with said member parts for selectively pivoting the same from one of said positions into the other.

References Cited
UNITED STATES PATENTS

| | | | |
|---|---|---|---|
| 1,578,103 | 3/1926 | Suttill et al. | 249—172 |
| 1,745,891 | 2/1930 | Dimeo | 249—172 |
| 2,961,705 | 11/1960 | Wacker. | |
| 3,016,574 | 1/1962 | Fischer et al. | |
| 3,212,130 | 10/1965 | Elphee. | |

WILBUR L. McBAY, Primary Examiner

U.S. Cl. X.R.

18—42; 249—170; 264—328